(12) United States Patent
Tian

(10) Patent No.: US 9,777,871 B1
(45) Date of Patent: Oct. 3, 2017

(54) HINGED PIPE MOUNTING FIXTURE

(71) Applicant: Jiaxing Tian, Sunnyvale, CA (US)

(72) Inventor: Jiaxing Tian, Sunnyvale, CA (US)

( * ) Notice: Subject to any disclaimer, the term of this patent is extended or adjusted under 35 U.S.C. 154(b) by 0 days.

(21) Appl. No.: 15/083,066

(22) Filed: Mar. 28, 2016

(51) Int. Cl.
*F16L 3/08* (2006.01)
*F16L 3/123* (2006.01)
*F16L 3/22* (2006.01)

(52) U.S. Cl.
CPC .............. *F16L 3/123* (2013.01); *F16L 3/222* (2013.01)

(58) Field of Classification Search
CPC ... F16L 3/24; F16L 55/035; F16L 3/13; F16L 3/237; F16L 3/04; F16L 3/223; F16L 3/127; F16L 3/12; F16L 3/2235; F16L 3/22; F16L 3/00; F16L 3/233; F16L 3/08; F16L 3/1075; F16L 3/02; F16L 3/137; H02G 3/32; H02G 3/30; H02G 3/26; H02G 3/263; H02G 3/22; H02G 11/00; H02G 3/0608; H02G 3/0456; H02G 3/0437; H02G 3/0487; H02G 3/0418; H02G 3/0443; H02G 3/045; H02G 7/053; H02G 11/006

USPC .......... 248/49, 57, 58, 62, 65, 73, 74.1, 74.4
See application file for complete search history.

(56) References Cited

U.S. PATENT DOCUMENTS

| | | | |
|---|---|---|---|
| 2,373,833 A * | 4/1945 | Johnson | F16L 3/1233 248/74.3 |
| 2,931,605 A | 4/1991 | Kelly | |
| 5,009,386 A | 4/1991 | Berger | |
| 7,284,728 B2 | 10/2007 | Connolly | |
| 7,908,725 B1 * | 3/2011 | Irish | F16L 3/223 248/74.2 |
| 8,297,561 B1 | 10/2012 | Montplaisir et al. | |
| 9,222,602 B2 * | 12/2015 | Dworak, Jr. | F16L 3/1075 |
| 9,243,723 B2 * | 1/2016 | DeCesare | F16L 3/04 |
| 9,512,940 B2 * | 12/2016 | Blakeley | H02G 3/32 |
| 2002/0088905 A1 * | 7/2002 | Hansen | F16B 2/06 248/65 |
| 2007/0272806 A1 | 11/2007 | Kim | |
| 2009/0065659 A1 * | 3/2009 | Dann | F16L 3/24 248/74.1 |
| 2009/0294600 A1 * | 12/2009 | Dodge | F16L 3/12 248/73 |
| 2014/0027584 A1 * | 1/2014 | Pauchet | F16L 3/123 248/68.1 |

* cited by examiner

*Primary Examiner* — Steven Marsh
(74) *Attorney, Agent, or Firm* — Robert Brownstein

(57) ABSTRACT

The system herein disclosed and claimed is hinged pipe mounting fixture.

4 Claims, 8 Drawing Sheets

HINGED PIPE MOUNTING FIXTURE

TECHNICAL FIELD

This invention is associated with building construction components.

BACKGROUND OF THE INVENTION

It is common practice when constructing buildings to connect a water supply line to a network of pipes that will deliver cold and hot water flow to various faucets and to one or more water heaters and water treatment devices.

The network of pipes is typically constructed using segments of metallic pipe which are usually affixed to wooden floor joists under the lowest level flooring.

It is common for pipe segments to be joined using straight and angular couplings which are then soldered in place to establish cohesion and leak proofing.

The segments thus joined are usually affixed to the wooden floor joists using some type of mounting fixture.

The mounting fixtures are designed to hold the pipe against the floor joists using metallic screw hardware.

The nature of such mounting fixtures is that when applied, the pipe is pressed up against the floor joists making soldering at that point risky because of the proximity to the wood. As a result, the pipe segments are typically joined and soldered at ground level, while well below the wooden joists, and only later affixed to the joists.

BRIEF SUMMARY OF THE INVENTION

The invention herein disclosed and claimed is a mounting fixture that enables the pipe segments to be partially attached to the joists but be positioned below them for joining and soldering until ready for full attachment.

As such, the invention enables attaching the network pipe segments to the joists before they are joined and soldered, and then they can be pressed into position against the floor joists and the attachment is then completed.

When partially attached to the joists, the pipe segments are far enough away from the wooden joists to allow joining and soldering without the danger of a flame close to the wood.

BRIEF DESCRIPTIONS OF THE DRAWINGS

DETAILED DESCRIPTION OF THE INVENTION

It is common practice when constructing buildings to connect a water supply line to a network of pipes that will deliver cold and hot water flow to various faucets and to one or more water heaters and water treatment devices.

Generally the pipe network is made up of segments of pipe that are sized, arranged and joined to one another to essentially connect the water supply source to a water heating subsystem which provides the heated water to the hot-water portion of the pipe network; and directly to the cold-water portion of the pipe network.

This hot-water and cold-water pipe network is essentially oriented horizontally and located under the lowest-level flooring of the building. At the appropriate positions a vertical portion of pipe will extend upward to connect the hot water or cold water flow to appropriate valves or faucets.

The horizontal portion of the pipe network is typically mounted to the floor joists underneath the lowest-level flooring. Vertical extensions of the pipe network may be mounted against wood studs depending on the location of the target valve or faucet.

When constructing the pipe network it is common for the pipe segments to be joined by straight or angled couplings and the resulting combination then soldered for cohesion and leak proofing.

Where the lowest level floor is located just above a foundation crawl space, a very typical situation, there is very little vertical room in which to work on constructing the pipe network. Often the bottom surface is compacted soil and the person or persons assembling the pipe network will layout, join and solder the network portions, on the ground, and then, with help, lift up the joined sections and mount them to the floor joists.

One could first mount the unsoldered segments and then solder them but the pipe is located dangerously close to flammable wood (the joists). This would make it easier for fewer people to assemble the pipe network but increases the risk of fire damage.

Figure 1:
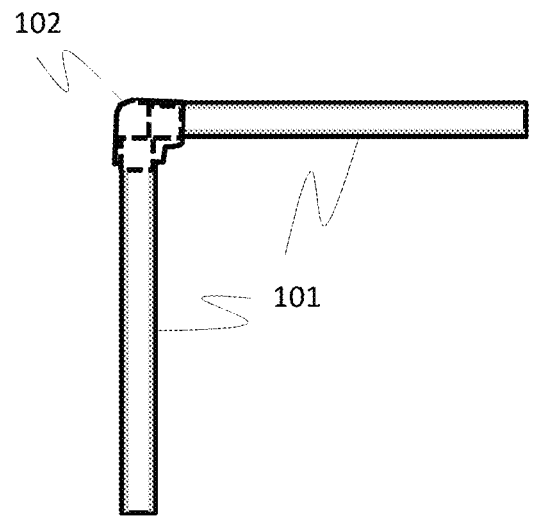
FIG. 1 depicts two pipe segments being joined by a coupling so that they are at right angles to one another.
Figure 2:
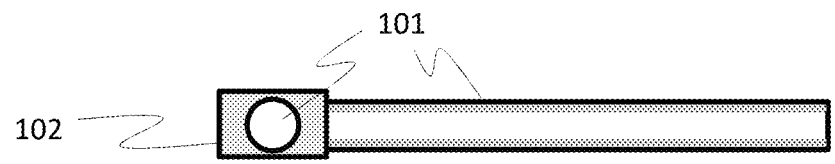
FIG. 2 is another view of FIG. 1 showing the juxtapositions of the pipe segments and coupling from another perspective.

FIGS. 1 and 2 show pipe segments being joined at right angles. The pipe segments 101 are placed into the coupling 102 and then coupling and pipe surfaces are soldered to create a strong cohesion and prevent leakage.

Figure 3:
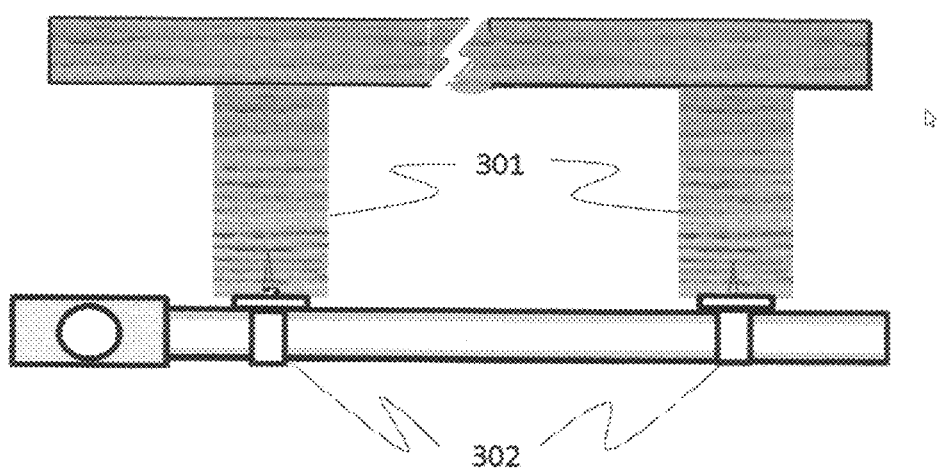
FIG. 3 is an exemplary view of the joined pipe segments of FIG. 2 being mounted to floor joists.
Figure 4:
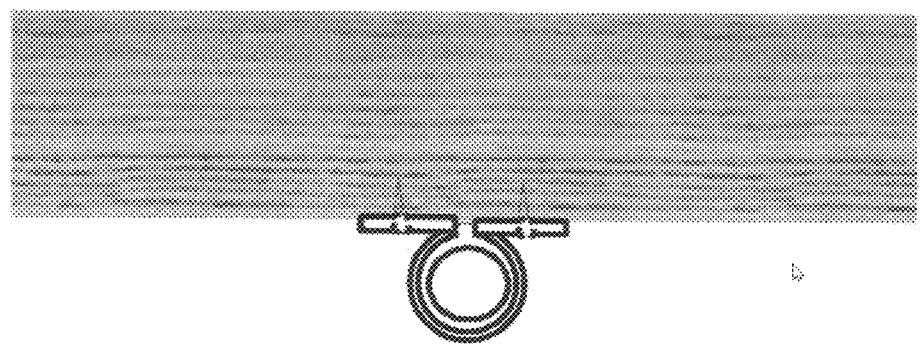
FIG. 4 is another view of FIG. 3 from an axial perspective showing the mounting fixture suspending the pipe segment against the floor joist.

FIGS. 3 and 4 show how the pipe network represented by FIG. 2 is mounted to floor joists. Existing mounting fixtures 302 are used to secure the pipe to the bottom edges of the floor joists 301.

Figure 5:
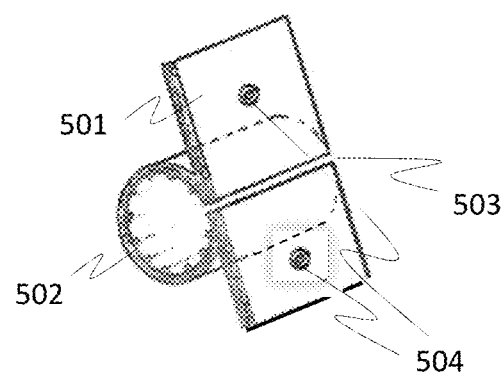
FIG. 5 is a view of the mounting fixture showing the pipe segment cylindrical sleeve and two screw holes that will attach it to the wooden floor joist.
Figure 6:
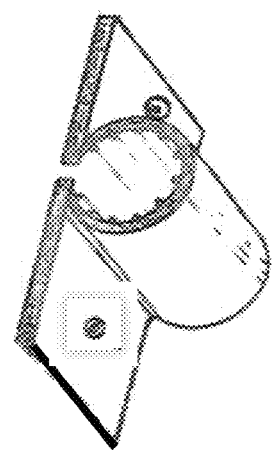
FIG. 6 is the same fixture as in FIG. 5 from a different perspective showing the sleeve and screw holes.

FIGS. 5 and 6 show different views of an existing pipe mounting fixture. A rectangular strip of semi-flexible material, that is, material which can be bent without breaking and will return to its original shape, is formed into a rectangular base element 501 and cylindrical sleeve 502. The sleeve thus formed has a slit 503 which permits its circumference to be widened sufficiently to allow a pipe to be inserted in the sleeve and then held snugly once it resumes its original cylindrical shape. As shown in FIGS. 3 and 4, these existing fixtures are meant to secure the pipe to a wooden support and even when one screw is tightened, the pipe is essentially held nearly flush to the wooden support.

Figure 7:
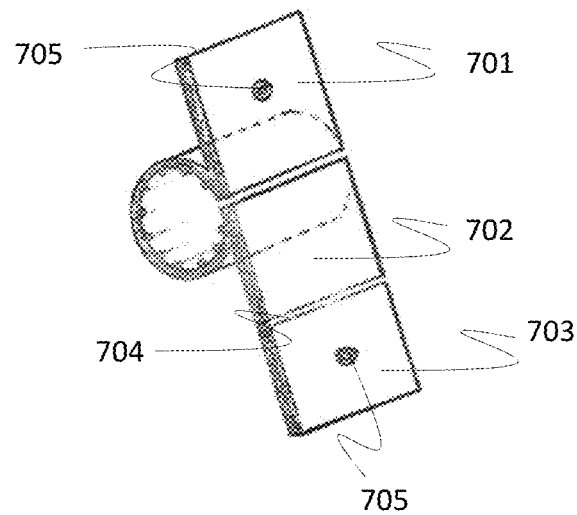
FIG. 7 is one embodiment of the invention mounting fixture. It shows the hinging feature that allows the fixture to be partially attached while suspended below the joists.
Figure 8:
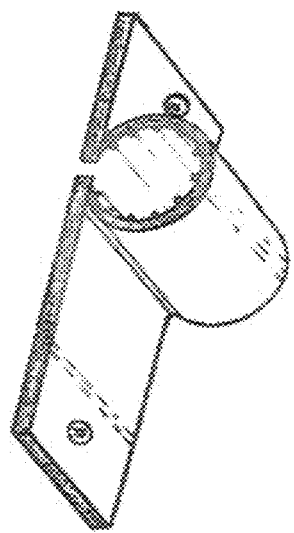
FIG. 8 is another view of the embodiment showing the hinging feature.

FIGS. 7 and 8 show one embodiment of the invention herein disclosed and claimed. Like the fixture of FIGS. 5 and 6, this embodiment is made of a rectangular strip of semi-flexible material. A sleeve is formed as well. However, the base thus formed 701, 702 and 703 differ from the existing fixture. A hinge feature 704 enables one portion of the base structure (703) to bend relative to the other portions (701 and 702). This permits the mounting fixture to be attached with a single screw to a floor joist through screw hole 705 while bending away for the joist surface. Note that the lengths of the base portions are different. Base portion 701 is shorter than base portions 702 and 703. For purpose of definition, the base portion corresponding to 701 will be called "short base portion." The fixed base portion 702 and bendable base portion 703 will be called "longer base portion."

Figure 9:
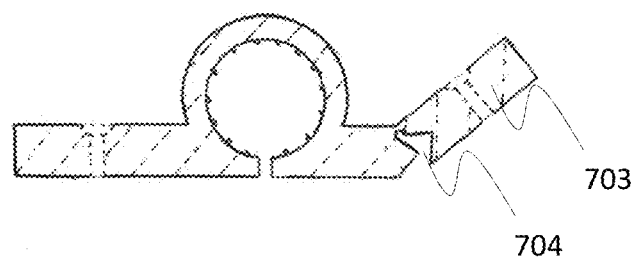
FIG. 9 is another view of the embodiment fixture showing the hinging feature rotated at an angle to the fixture's base.
Figure 10:
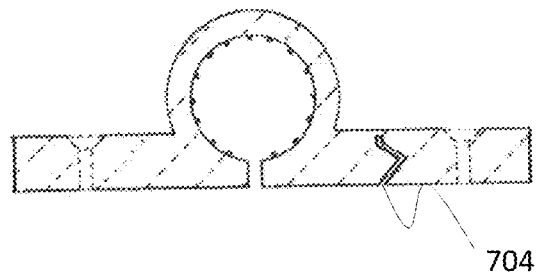
FIG. 10 is another view of the embodiment fixture showing the hinging feature closed so that the portion of the fixture previously rotated with respect to the base is now parallel to the base of the fixture.

FIGS. 9 and 10 show a side view of this embodiment of FIGS. 7 and 8. Note that the hinge feature 704 allows the bendable base portion 703 to bend toward the cylindrical sleeve. When ready to be fully attached to the joist, the fixture is rotated flush with the joist and a second screw then secures it in position. Note that the interface along the surface of the hinge feature is such that the two sides lock together preventing detachment of the fixture should the hinge material tear.

Figure 11:
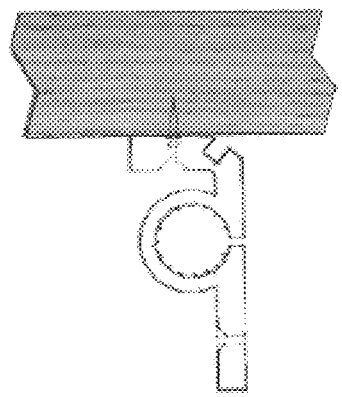
FIG. 11 shows the fixture of FIGS. 9 and 10 partially attached to a wooden floor joist by a metallic screw through the screw hole of the portion attached to the hinging feature.

FIG. 11 shows the invention fixture attached by the bendable portion using one screw to the joist. This allows the rest of the fixture to rotate down away from the wood surface. A pipe held by that fixture could be soldered with less risk of fire.

Figure 12:
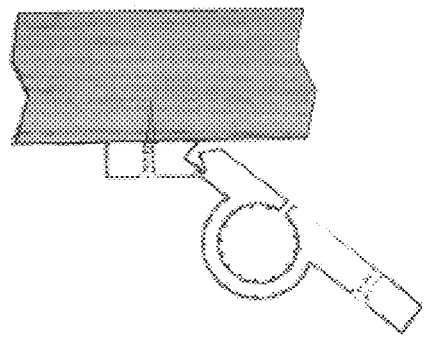
FIG. 12 shows how the fixture may be rotated to facilitate full attachments.

When ready to be fully attached, the mounting fixture is rotated toward the joist as shown in FIG. 12.

Figure 13:
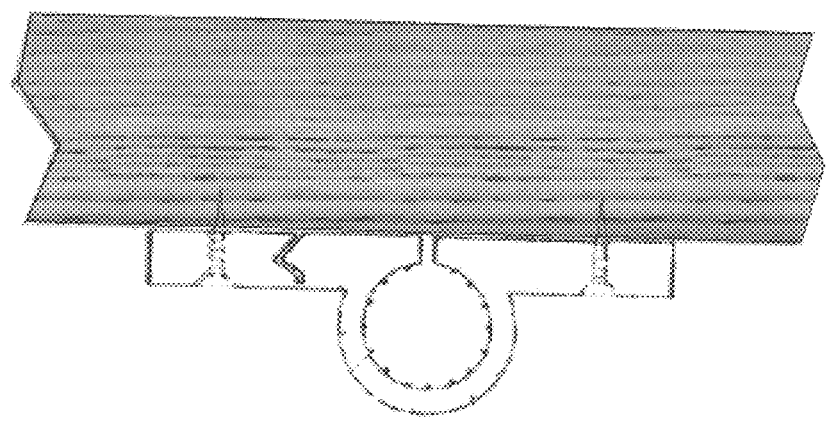
FIG. 13 shows the fixture of FIGS. 9 and 10 rotated such that the fixture is now flush against the floor joist and a second metallic screw now fully attaches the fixture to the floor joist.

When fully flush with the joist as shown in FIG. 13, a second screw is then used to firmly and fully mount the pipe in position.

Figure 14:
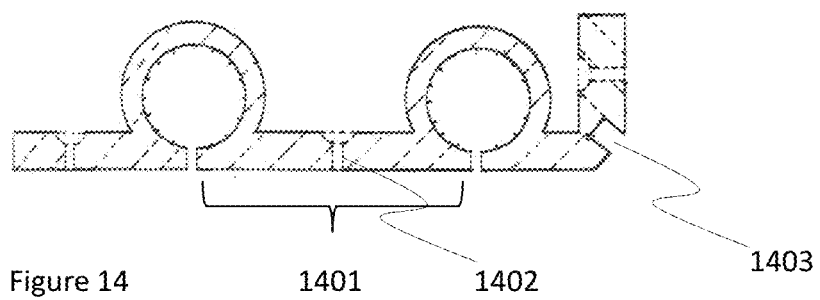
FIG. 14 shows another embodiment of the invention in which there are two pipe segment cylindrical sleeves and an additional screw hole. The hinging feature shows the one portion of the fixture rotated essentially at right angles to the fixture base.
Figure 15:
FIG. 15 shows another view of the embodiment of FIG. 14 where the portion of the base connected to the hinging feature is now parallel to the base.

Another embodiment of the invention is shown in FIGS. 14 and 15. Here two cylindrical sleeves are formed in the base element. The two sleeves are separated by a portion of base 1401 and a third screw hole is included 1402. This embodiment of the invention would allow two separate and parallel pipe segments to be mounted and secured by a single fixture. For example, cold and hot water network lines could be routed in parallel and mounted using these fixtures. Again a hinge feature 1403 allows partial attachment, followed by in place joining and soldering, followed by full mounting.

There are a variety of materials which can be used for these fixtures. They need to be suitably flexible and strong. The dimensions of the fixture are related to the outer diameter of the pipe being used.

The drawings and description are meant to be exemplary and should not be read as limiting the scope of the invention.

What is claimed is:

1. A system comprising:
a rectangular base element of semi-flexible material;
a cylindrical sleeve formed in said rectangular base element such that it is axially perpendicular to long sides of said rectangular base element and located essentially one-third of the way from one end of said rectangular base element and two-thirds of the way from a second end of said rectangular base element;
a first screw hole essentially equidistant from sides of said one end of said rectangular base element;
a second screw hole essentially equidistant from short-side edge and two longer sides of said second end of said rectangular base element;
a hinging feature located essentially half way between said short-side edge of said second end of said rectangular base element and axis of said cylindrical sleeve and oriented parallel to said axis of said cylindrical sleeve;
said hinging feature is operative to displace said cylindrical sleeve from a wooden joist to which said rectangular base element is initially mounted, thereby allowing a pipe segment to be inserted in said cylindrical sleeve, then safely soldered, and later fully mounted to said wooden joist.

2. A system as in claim 1 further comprising:
inner circumference of said cylindrical sleeve is essentially equal to outer circumference of a standard pipe;
said short side of said rectangular base is essentially equal to diameter of said cylindrical sleeve.

3. A system comprising:
a said rectangular base element of said semi-flexible material;
two said cylindrical sleeves formed in said rectangular base element such that each is axially perpendicular to said long sides of said rectangular base element;
one said cylindrical sleeve is located essentially one-fifth of the way from said one end of said rectangular base element;
other said cylindrical sleeve is located essentially three-fifths of the way from said second end of said rectangular base element;
a first said screw hole essentially equidistant from said sides of said short end of said rectangular base element;
a second said screw hole essentially equidistant from said short-side edge and two longer sides of said second end of said rectangular base element;
a third said screw hole essentially equidistant between said axis of said one cylindrical sleeve and said axis of said other cylindrical sleeve and equidistant from said longer sides of said rectangular base element;
said hinging feature located essentially half way between said short-side edge of said second end of said rectangular base element and axis of said cylindrical sleeve, located closest to said hinging feature, and oriented parallel to said axis of said cylindrical sleeve;
said hinging feature is operative to displace said cylindrical sleeves from a wooden joist to which said rectangular base element is initially mounted, thereby allowing pipe segments to be inserted in said cylindrical sleeves, then safely soldered, and later fully mounted to said wooden joist.

4. A system as in claim 3 comprising:
said inner circumference of said one cylindrical sleeve is essentially equal to said outer circumference of said standard pipe;
said inner circumference of said other cylindrical sleeve is essentially equal to said outer circumference of said standard pipe;
said short side of said rectangular base is essentially equal to the diameter of said cylindrical sleeve.

* * * * *